Dec. 6, 1932.  J. J. MILLER  1,890,400

FISH LURE

Filed Jan. 22, 1931

Inventor
J. J. Miller
By Watson E. Coleman
Attorney

Patented Dec. 6, 1932

1,890,400

UNITED STATES PATENT OFFICE

JOSEPH J. MILLER, OF WEST ALLIS, WISCONSIN

FISH LURE

Application filed January 22, 1931. Serial No. 510,520.

This invention relates to improvements in fish lures, and pertains particularly to the spoon type of lure.

The primary object of the present invention is to provide a lure comprising a spoon and hook, in which the design is such that the lure will be made to perform a number of different movements in the water which will cause it to more closely resemble the movements of a wounded minnow.

Another object of the invention is to provide an improved lure of the weedless type, which will be inexpensive to manufacture and of a design which will not easily become broken or in any manner injured when not in use.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claim.

Figure 2:
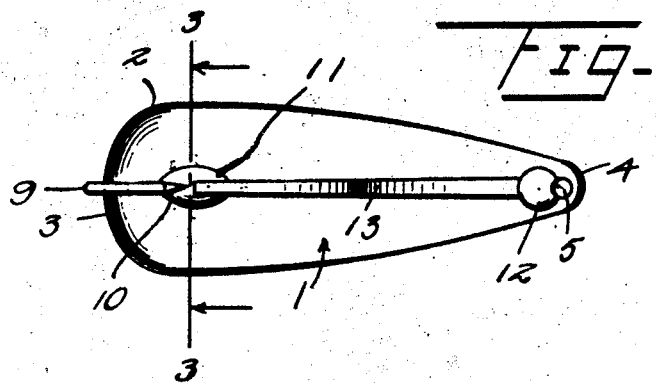
Figure 2 is a view in top plan of the lure.
Figure 3:
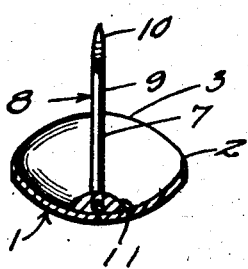
Figure 3 is a view in cross-section of the lure taken on the line 3—3 of Figure 2.

Referring more particularly to the drawing, wherein like numerals of reference indicate corresponding parts throughout the several views, the numeral 1 indicates generally the spoon of the present lure, which spoon is, as shown in Figure 2, generally pear shaped, that is, the point of greatest width is at the rear end thereof and from this point, which is indicated by the numeral 2, the side edges of the spoon merge abruptly with the broad curved rear end 3. The side edges of the spoon from the broad point 2, adjacent the rear thereof, are only slightly curved and they converge at the forward end of the spoon, which is relatively sharp, as shown. This sharp or narrow forward end, which is indicated by the numeral 4, is provided with an aperture 5 in which the fishing line 6 may be secured.

At the rear of the spoon there is secured to the inner face thereof the shank portion 7 of a hook, which is indicated generally by the numeral 8. The shank of the hook is relatively short and passes directly over the rear curved edge 3 of the spoon, as shown in Figure 1, and a short distance beyond this edge it merges into the bend 9 which terminates in the forwardly directed barbed point 10, the barb being directed inwardly toward the bowl of the spoon.

The point 10 of the hook is directed outwardly slightly away from the spoon or, in other words, is directed outwardly from the longitudinal center of the spoon. Any suitable means may be employed for securing the shank portion of the hook 7 in the bowl of the spoon as, for example, it may be soldered or welded in place, as indicated at 11.

Adjacent the forward end of the spoon there is secured, as at 12, one end of a guard tongue 13, the other end of which is disposed in close proximity and forwardly of the point 10 of the hook. This guard 13 is of soft non-springing or resilient metal such, for example, as copper, so that when the hook is taken by a fish the guard will be bent down into the bowl of the spoon and will remain in this position and will not therefore press against the mouth of the fish as it would do if it were of resilient metal, and assist the fish in its efforts to free itself of the hook. It will, of course, be understood that this guard is provided to prevent weeds becoming attached to the hook and it is therefore of sufficient rigidity to accomplish this result.

Figure 1:
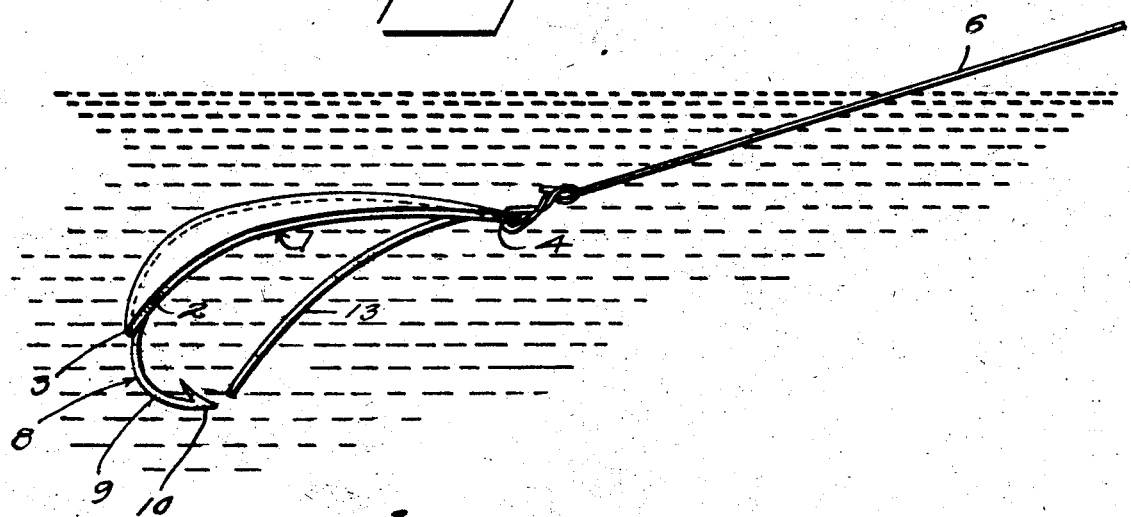
Figure 1 is a view in side elevation of the lure embodying the present invention, showing the same in the position assumed when in the water.

When in use the lure assumes the position shown in Figure 1 and the line of pull on the lure extends directly across the center of the rear end of the spoon, as shown in Figure 1, so that a line drawn directly back from the fish line 6 would contact with both the front and rear ends of the spoon.

As the spoon is drawn through the water it will oscillate back and forth or "wabble"

along a relatively broad arc and at times it will go into a spin which will be continued for a period, following which the spinning action will be reversed and this will continue for substantially the same period as the previous spinning action. This alternation in the spinning of the spoon and the performance of the wabbling action is obtained through the peculiar design of the spoon, and the motions strongly resemble the motions of an injured or wounded fish and are therefore very attractive to larger fish. It will, of course, be understood that the spoon is polished upon the inner and outer surfaces so that it will be readily seen by the pursuing or game fish.

In addition to the advantage obtained by using a weed guard or non-resilient metal so that it does not bear against the mouth of the fish after the same has been hooked, another advantage is had in the use of a guard of this character and that is that it serves to indicate to the fisherman, particularly when fishing in rough water, whether a strike has been had. This will be shown when the lure is drawn in for if a fish has struck at the lure the guard may be bent in and the fisherman will then know to cast again in the same location. If the guard has not been moved from position then a new location might be selected.

Having thus described my invention, what I claim is:

A fish lure of the character described, comprising a spoon of gradually increasing width from a narrow forward end to the opposite end thereof, said opposite or rear end being rounded slightly to define a broad arc and being of greater width than the intermediate portion of the spoon, a hook having the shank portion disposed against the concave face of the spoon and extending over and in close proximity to the broad rear edge, said hook being disposed upon the longitudinal center of the spoon, means for attaching a line to the forward end of the spoon, and a guard secured to the spoon at the forward end and extending longitudinally thereof in the same plane as the point of the hook and terminating adjacent the point of the hook.

In testimony whereof I hereunto affix my signature.

JOSEPH J. MILLER.